Patented Apr. 14, 1942

2,279,292

UNITED STATES PATENT OFFICE 2,279,292

ISOMERIZING HYDROCARBONS

Harry A. Cheney, Berkeley, Calif., assignor to Shell Development Company, San Francisco, Calif., a corporation of Delaware No Drawing. Application April 28, 1941, Serial No. 390,751

10 Claims. (Cl. 260—676)

The present invention relates to a new and improved method for the isomerization of saturated hydrocarbons, and more particularly saturated hydrocarbons containing from four to nine carbon atoms. A particular embodiment of the invention relates to an improved method whereby butane and/or pentane can be more efficiently isomerized.

It is well known that isomerization of saturated hydrocarbons can be catalyzed by the aluminum halides. Normal butane, for example, is isomerized at room temperature in a period of about a month to an equilibrium mixture of normal butane and isobutane containing about 80% isobutane in the presence of aluminum bromide or aluminum chloride. It is also known that the presence of a hydrogen halide, such as hydrogen chloride, accelerates the reaction, and it was recently found that by the use of a large partial pressure of hydrogen chloride such isomerization reactions may be made to approach a practical rate. The aluminum halides, however, per se, even in the presence of a hydrogen halide, are not entirely satisfactory catalysts for hydrocarbon isomerization. At low temperatures the isomerization rate is usually too slow for practical consideration and at higher temperatures these catalysts tend to cause degradation reactions which lead to the formation of by-products which, in turn, polymerize and undergo other secondary reactions. These by-products even when formed in relatively small amounts quickly coat the catalyst particles, preventing efficient contact, and cause the particles of aluminum halide to agglomerate into sticky lumps which slowly change to an oily liquid. This oily liquid has a certain catalytic activity and is capable of catalyzing polymerization and similar reactions but is much less active than the aluminum halides as an isomerization catalyst.

In view of these practical difficulties, considerable work has been done in an effort to discover a better catalyst. It is known that a large number of metal halides such as the halides of Be, B, Ti, V, Cr, Mn, Fe, Ni, Co, Zn, Zr, Sn, Sb, Bi, acids such as sulfuric acid, sulfonic acids, phosphoric acids, and the like, and even certain clays, etc., act similarly to aluminum halides in many reactions such as the polymerization of olefins, alkylation of aromatic hydrocarbons, etc., and it was assumed that of these catalysts at least some would prove to be active isomerization catalysts. However, all of these materials proved to be substantially inactive as isomerization catalysts. It is true that isomerization of certain saturated hydrocarbons to relatively small extents has been noted with such materials as zirconium chloride, beryllium chloride, molybdenum sulfide, and a mixture of boron fluoride and nickel under severe conditions, but processes utilizing these materials fail to attain yields and efficiency essential to practical commercial operation. It is now well known that the effectiveness of a catalyst in its application to other hydrocarbon reactions such as polymerization, alkylation, cracking, etc., is no criterion of its ability to catalyze the isomerization of saturated hydrocarbons.

I have investigated the use of liquid aluminum halide catalysts. The aluminum halides per se when used in the molten state are entirely unsuited as isomerization catalysts since at temperatures above their melting points they cause almost complete degradation of the hydrocarbon. It is known that the aluminum halides react with many other metal halides to form double compounds of the type $AlX_3 \cdot MeX_n$, wherein X represents an atom of chlorine or bromine, Me represent a metal, and n represents the valence of the metal Me, many of which are relatively low melting solids. Thus, aluminum chloride reacts with salts to form such double compounds as $AlCl_3 \cdot NaCl$, $AlCl_3 \cdot LiCl$, $AlCl_3 \cdot BaCl_2$, $AlCl_3 \cdot CaCl_2$, $AlBr_3 \cdot NaBr$, $AlBr_3 \cdot HgBr_2$. Double salts of this type have been frequently recommended as catalysts for polymerization and similar reactions. Double salts of this type were investigated, but were found, however, to be substantially devoid of any isomerizing activity. This, I believe, is due to the fact that the activity of the aluminum halide as an isomerization catalyst depends upon the presence of the secondary valence forces of the aluminum halide. In the complex double compounds these secondary valence forces are completely saturated. The use of such double salts containing an excess of the aluminum halide, i. e. solutions of aluminum halide in the melts of these double salts, were therefore investigated. These mixtures when they contain an appreciable excess of aluminum halide (for example, a mol ratio of aluminum halide to other metal halide of at least 1.2:1), are free-flowing liquids at relatively low temperatures and, it was found, possess an appreciable isomerization activity. This is illustrated by the following example.

Example I

One of the best of such catalyst mixtures consisting of aluminum chloride, sodium chloride and potassium chloride in the weight ratio of 8:1:1, respectively, was employed in the isomerization of normal butane under the following conditions:

Temperature_____ 100° C.
Contact time_____ 30 minutes.
Normal butane____ 55% by weight of the total charge.
Catalyst_____ 39% by weight of the total charge.
Hydrogen chloride_ 6% by weight of the total charge.

The conversion of n-butane to isobutane was 26%, that is, the hydrocarbon product contained 26% isobutane.

In view of the great utility which a process enabling the more efficient large scale isomerization of hydrocarbons would have in the industry, I have made an exhaustive study with the purpose of improving the isomerization activity of these fluid melts. These investigations have resulted in the discovery that the halides of certain metallic and non-metallic elements have the ability of promoting the desired activity of these catalysts. These promoted catalysts are described and claimed in my copending applications, Serial Nos. 387,463, and 389,771 filed April 8, 1941 and April 22, 1941, respectively. Upon further investigation I have now found that the effectiveness of these catalyst melts in catalyzing the hydrocarbon isomerization reaction may be substantially enhanced by the presence in small amounts of certain other promoting substances. These promoting substances comprise the halides of cobalt and nickel. Though these promoting substances by themselves do not have any appreciable effect upon the isomerization reaction, their incorporation into the above-described fluid melts results in a promoted catalyst particularly effective in catalyzing the isomerization of saturated hydrocarbons. By the use of these superior promoted catalysts the isomerization of saturated hydrocarbons may be effected with substantially improved rates and yields in a commercially attractive and more practical manner.

The improved conversions obtained with the promoted catalysts of the invention are illustrated in the following examples. These examples, it will be noted, are purposely chosen to be strictly comparable. Thus, in each case the material treated is pure normal butane and in each case, aside from the catalyst employed, the conditions are identical. It is to be understood, therefore, that these examples are set forth to demonstrate the superiority of the process of my invention and one suitable mode of operation, and that I do not consider my invention to be in any way limited to the particular hydrocarbon treated, the particular base catalyst employed, the particular conditions employed, or any other features shown therein.

*Example II*

Normal butane was isomerized under the conditions described in Example I, using a base catalyst of the same composition promoted for isomerization with 1 per cent by weight of anhydrous nickel chloride ($NiCl_2$). The conversion to isobutane obtained was 44.5 per cent.

*Example III*

Normal butane was isomerized under the conditions described in the foregoing examples, using a base catalyst of the same composition promoted for isomerization with 1 per cent by weight of anhydrous cobalt chloride ($CoCl_2$). A conversion to isobutane of 42.8 per cent was obtained.

It is seen from the above examples that, by the use of even relatively small amounts of the promoters, the isomerization activity is considerably increased. Thus, with comparatively short periods of contact time the presence of 1 per cent of $CoCl_2$ promoter in the catalyst increased the conversion to 164 per cent of that obtained with the unpromoted base catalyst, and the presence of 1 per cent of $NiCl_2$ promoter increased the conversion to 171 per cent of that obtained with the unpromoted base catalyst. This is an entirely unexpected finding, particularly in view of the fact that these promoter substances when used by themselves or in admixture with sodium chloride and/or potassium chloride show no isomerization activity whatsoever under the same conditions.

The process of the invention is applicable generally to the catalytic isomerization of isomerizable saturated hydrocarbons. Thus, it may be advantageously employed for the isomerization of saturated hydrocarbons containing at least four and preferably not more than nine carbon atoms. While the process is particularly adapted for the isomerization of open chain or paraffin hydrocarbons, it can also be advantageously applied for the isomerization of methyl cyclopentane, dimethyl cyclopentane, methyl cyclohexane, and similar naphthenic hydrocarbons. The process is particularly advantageous for the isomerization of butane and/or pentane. These hydrocarbons may be obtained in large quantities as individual compounds in a relatively pure state. The hydrocarbon treated, however, need not necessarily be a pure individual hydrocarbon, but may be a mixture of one or more hydrocarbons. Thus, the invention provides a practical process for converting the normal butane and normal pentane contents of commercial hydrocarbon mixtures such as are obtained from natural gases, petroleum distillates, cracked distillates, etc. to their valuable branched chain isomers. Especially suitable mixtures of hydrocarbons are the so-called butane-butylene fractions and pentane-amylene fractions from which unsaturated hydrocarbons have been substantially removed. Treatment of such mixtures obtained, for instance, as by-products in the sulfuric acid alkylation of isoparaffins results in materially increasing their contents of branched chain isomers and converting them to suitable raw materials for re-use in the alkylation process. Technical butane and pentane fractions such as those containing from 70% to 98% of the normal isomer and from 2% to 30% of the branched chain isomer may be conveniently treated in accordance with the process of the invention and their content of branched chain isomers materially increased without loss due to decomposition, and side reactions. Other mixtures of saturated hydrocarbons such as straight run gasoline, casinghead gasoline, etc., containing appreciable quantities of normal butane, normal pentane, cyclohexane, methyl cyclohexane, or lower boiling non-branched saturated hydrocarbons may be advantageously treated to produce products which are suitable for alkylation of olefins and have superior ignition characteristics. It is found that the greatest improvement in ignition characteristics is obtained when treating such hydrocarbon fractions boiling predominantly below 70° C.

The hydrocarbon or mixture of hydrocarbons treated is preferably substantially free of materials which are particularly prone to undergo side reactions such as degradation, polymerization, etc., under the reaction conditions. According to the preferred embodiment of the invention, excessive quantities of olefins, diolefins, or other detrimental impurities in the hydrocarbon or hydrocarbon mixture to be treated are removed prior to isomerization by a suitable treatment such as by a mineral acid refining, hydrogenation, or the like.

The saturated hydrocarbon or mixture of saturated hydrocarbons is isomerized, according to the process of the invention, using molten promoted catalysts of the above described type. In the catalysts employed in the process of my invention, the aluminum halide is combined with at least one halide of the group consisting of the halides of Li, Na, K, Rb, Cs, Be, Mg, Zn and Cd. These metals, it will be noted, are all members of the first and second groups of the Mendeljeff system of the elements and all form easily fusible halide salts of closely related properties. They all react with aluminum halides to form double halide salts of the type described. Of the available aluminum halides, aluminum chloride and aluminum bromide are generally used. The alkaline metal halide component or components are also generally the chloride and/or bromides. It is not essential, however, that the halides of the alkaline metal and aluminum correspond. Thus, I may use a suitable bromide and/or chloride in conjunction with aluminum bromide and/or chloride.

The ratio of aluminum halide to alkaline metal halide may vary within the scope of the invention in accordance with the particular characteristics of the catalyst desired, operating conditions, etc. As explained above, the aluminum halide must be used in molecular excess and is preferably used in mol ratio of 1.2 to 1, or greater. In general, mol ratios of aluminum halide above about 5 to 1 are not preferred since they require higher temperatures and consequently cause excessive degradation, especially when treating the less stable hydrocarbons. Particularly suitable catalysts comprise the aluminum halide and other metal halides in the ratios of proportions, between the above limits, corresponding to or approaching their eutectic mixtures.

These catalysts, which as shown above possess appreciable isomerization activity, are promoted and greatly improved by the incorporation of activating amounts of suitable promoters. As indicated above, I have found that suitable promoters comprise the halides of cobalt and nickel. Although the invention is not limited to a particular halide of these metals, their chlorides are somewhat preferred. When utilizing a halide of cobalt as the promoter I generally prefer to use the lower halide of this metal, for example, cobaltous chloride.

The above-described halides, herein referred to as promoters, are themselves inactive as catalysts. They are therefore added to the base catalyst in minor proportions since their use in more than necessary amounts serves only to dilute and reduce the activity of the catalyst. In general, the optimum promoting effect is found to correspond to concentrations in the catalyst in the order of from about 1 to 5 per cent. Amounts up to about 10 per cent and as low as 0.3 per cent, however, usually give improved results and may be employed.

The isomerization when employing the above-described promoted fluid catalysts is preferably effected in the presence of a hydrogen halide such as hydrogen chloride. This is preferably introduced into the reaction zone with the hydrocarbon feed and, if desired, recovered from the product by conventional methods and recycled through the reaction zone. The amount of hydrogen halide used may vary widely in accordance with the nature of the charge, the catalyst activity, and the operating conditions. In such cases where it is not desired to recover and recycle the hydrogen halide, minimum quantities, such as from about 0.3% to 5% of the hydrocarbon feed are usually employed. When the hydrogen halide is recovered and recycled, however, much larger quantities, for instance up to at least 25% of the hydrocarbon charge, may be economically employed. Also, if desired, in order to inhibit cracking and other undesirable side reactions, a limited amount of hydrogen may be introduced with the hydrogen halide. Inert materials such as pumice, coke, brick chips and the like, and gases such as CO, $CO_2$, $N_2$, $CH_3$, etc., appear to exert no deleterious effect upon the activity of the catalyst and may be present in the reaction zone. Water and hydrogen sulfide, however, are detrimental and are excluded as far as practical.

The isomerization, according to the present process, may be executed at temperatures ranging from the minimum temperature at which the catalyst may be maintained in the fluid state up to approximately 200° C. The minimum temperatures at which the catalyst may be maintained in a mobile liquid state depends upon the composition of the particular catalyst. By combining $AlCl_3$ and/or $AlBr_3$ with suitable proportions of NaCl, KCl or $ZnCl_2$, and preferably a mixture of two or more of these salts, for instance, very desirable base catalysts may be produced which may be employed as free-flowing liquids at temperatures in the order of 100° C.–130° C. and even lower.

Pressure appears to have little influence upon the isomerization reaction. When effecting the isomerization in the vapor phase pressures ranging from about atmospheric pressure up to about 250 pounds per square inch are usually most advantageously employed. When effecting the isomerization in the liquid phase the pressure is, of course, always sufficient to maintain at least a substantial portion of the hydrocarbon feed in the liquid phase at the operating temperature. Higher pressures may, however, be used, if desired.

The described fluid promoted catalyst may be employed in the process of the invention for the isomerization of saturated hydrocarbons in either the liquid or vapor phase. The vapor phase isomerization of butane using these promoted catalysts is a very attractive process. Higher hydrocarbons and hydrocarbon mixtures, on the other hand, are usually more advantageously isomerized in the liquid phase.

The isomerization may be carried out either batchwise or continuously and with either concurrent or countercurrent flow of the hydrocarbon and fluid catalyst. Thus, the process may be effected in simple apparatus of conventional type such as stirring autoclaves, packed towers, tubular reactors, and the like.

The process of my invention utilizing the described promoted fluid catalysts has many advantages over hitherto-proposed isomerization processes. In my process, due to the excellent contact obtained with the fluid catalyst and the greatly improved isomerizing activity resulting from the use of activating amounts of the described promoters, excellent and practical conversions may be obtained at much greater throughput rates. The isomerization may be executed continuously under relatively mild operating conditions in simple apparatus of conventional designs, and difficulties hitherto encountered due to agglomeration of solid aluminum chloride and volatilization of the catalyst are eliminated.

I claim as my invention:

1. A process for isomerizing saturated hydrocarbons which comprises contacting an isomerizable saturated hydrocarbon under isomerizing conditions with a fluid melt comprising a molecular excess of aluminum chloride and a halide of an alkali metal promoted by from 0.3% to 10% of nickelous chloride, whereby isomerization is effected as the primary reaction.

2. A process for isomerizing saturated hydrocarbons which comprises contacting an isomerizable saturated hydrocarbon under isomerizing conditions with a fluid melt comprising a molecular excess of aluminum chloride and a halide of an alkali metal promoted by from 0.3% to 10% of cobaltous chloride, whereby isomerization is effected as the primary reaction.

3. A process for isomerizing saturated hydrocarbons which comprises contacting an isomerizable saturated hydrocarbon under isomerizing conditions with a fluid melt comprising a molecular excess of an aluminum halide and a halide of an alkali metal promoted by from 0.3% to 10% of a halide of nickel, whereby isomerization is effected as the primary reaction.

4. A process for isomerizing saturated hydrocarbons which comprises contacting an isomerizable saturated hydrocarbon under isomerizing conditions with a fluid melt comprising a molecular excess of an aluminum halide and a halide of an alkali metal promoted by from 0.3% to 10% of a halide of cobalt, whereby isomerization is effected as the primary reaction.

5. A process for isomerizing saturated hydrocarbons which comprises contacting an isomerizable saturated hydrocarbon under isomerizing conditions with a fluid melt comprising an aluminum halide, a halide of sodium and a halide of potassium in the weight ratio of about 8:1:1 promoted by an activating amount of a halide of a melt selected from the metals of the first transition series of the elements included in group VIII of the periodic table, whereby isomerization is effected as the primary reaction.

6. A process for isomerizing saturated hydrocarbons which comprises contacting an isomerizable saturated hydrocarbon under isomerizing conditions with a fluid melt comprising a molecular excess of an aluminum halide, a halide of sodium and a halide of potassium promoted by an activating amount of a halide, of a metal selected from the metals of the first transition series of the elements included in group VIII of the periodic table, whereby isomerization is effected as the primary reaction.

7. A process for isomerizing hydrocarbons which comprises contacting an isomerizable saturated hydrocarbon under isomerizing conditions with a fluid melt comprising a molecular excess of an aluminum halide and a halide of an alkali metal promoted by an activating amount of a dichloride of a metal selected from the metals of the first transition series of the elements included in group VIII of the periodic table, whereby isomerization is effected as the primary reaction.

8. A process for isomerizing saturated hydrocarbons which comprises contacting an isomerizable saturated hydrocarbon under isomerizing conditions with a fluid melt comprising a molecular excess of an aluminum halide and a halide of an alkali metal promoted by an activating amount of a halide of a metal selected from the metals of the first transition series of the elements included in group VIII of the periodic table, whereby isomerization is effected as the primary reaction.

9. A process for isomerizing saturated hydrocarbons which comprises contacting a hydrocarbon fraction consisting essentially of saturated hydrocarbons having from four to nine carbon atoms under isomerizing conditions with a fluid melt comprising a molecular excess of an aluminum halide and a halide of an alkali metal promoted by an activating amount of a halide of a metal selected from the metals of the first transition series of the elements included in group VIII of the periodic table, whereby isomerization is effected as the primary reaction.

10. A process for isomerizing butane which comprises contacting butane under isomerizing conditions with a fluid melt comprising a molecular excess of an aluminum halide and a halide of an alkali metal promoted by an activating amount of a halide of a metal selected from the metals of the first transition series of the elements included in group VIII of the periodic table, whereby isomerization is effected as the primary reaction.

HARRY A. CHENEY.